United States Patent
Fisch et al.

(10) Patent No.: US 12,072,312 B2
(45) Date of Patent: Aug. 27, 2024

(54) COMBINATION ELECTRODE HAVING EXTENDED REFERENCE CHAMBER

(71) Applicant: Hamilton Bonaduz AG, Bonaduz (CH)

(72) Inventors: Gabriela Fisch, Chur (CH); Theo Gaupp, Untervaz (CH); Dirk Schoenfuss, Bonaduz (CH); Claudius-Michael Ortega Schulte, Bonaduz (CH)

(73) Assignee: Hamilton Bonaduz AG, Bonaduz (CH)

( * ) Notice: Subject to any disclaimer, the term of this patent is extended or adjusted under 35 U.S.C. 154(b) by 466 days.

(21) Appl. No.: 17/345,656

(22) Filed: Jun. 11, 2021

(65) Prior Publication Data

US 2021/0302352 A1   Sep. 30, 2021

Related U.S. Application Data

(63) Continuation-in-part of application No. PCT/EP2019/084420, filed on Dec. 10, 2019.

(30) Foreign Application Priority Data

Dec. 13, 2018 (DE) .......................... 102018132131.7

(51) Int. Cl.
*G01N 27/403* (2006.01)
*G01N 27/30* (2006.01)
*G01N 27/36* (2006.01)

(52) U.S. Cl.
CPC ......... *G01N 27/301* (2013.01); *G01N 27/302* (2013.01); *G01N 27/36* (2013.01); *G01N 27/4035* (2013.01)

(58) Field of Classification Search
CPC ............ G01N 27/4035; G01N 27/301; G01N 27/302; G01N 27/36
See application file for complete search history.

(56) References Cited

U.S. PATENT DOCUMENTS

| 4,012,308 A | * | 3/1977 | Jerrold-Jones | ..... G01N 27/4035 |
| | | | | 204/408 |
| 2005/0133369 A1 | | 6/2005 | Sovrano et al. | ....... G01N 27/26 |
| | | | | 204/435 |

(Continued)

FOREIGN PATENT DOCUMENTS

| DE | 1090451 B | 12/1957 |
| DE | 9417267 U1 | 10/1994 |

(Continued)

*Primary Examiner* — Alexander S Noguerola
(74) *Attorney, Agent, or Firm* — Imperium Patent Works; Darien K. Wallace

(57) ABSTRACT

A pH combination electrode includes inner and outer tubes, working and reference electrodes, and a hydrogel diaphragm between the tubes. A seal is disposed inside the inner tube closer to a first inner tube end than to the second inner tube end. An extended reference chamber is formed inside the inner tube between the seal and the second inner tube end. A first conductive fluid is contained in the inner tube between the seal and the first inner tube end. A second conductive fluid is contained in the extended reference chamber and in a reference chamber formed between the inner and outer tubes. A through-hole in the inner tube allows the second conductive fluid to flow between the reference chamber and the extended reference chamber. The working electrode extends into the inner tube, through the seal and into the first conductive fluid. The reference electrode contacts the second conductive fluid.

22 Claims, 2 Drawing Sheets

(56) References Cited

U.S. PATENT DOCUMENTS

| | | | |
|---|---|---|---|
| 2012/0152765 A1 | 6/2012 | Trapp et al. ........... | G01N 27/26 205/787.5 |
| 2014/0034516 A1 | 2/2014 | Woodward et al. ... | G01N 27/30 27/302 |

FOREIGN PATENT DOCUMENTS

| | | |
|---|---|---|
| DE | 102005040764 A | 8/2005 |
| DE | 102009055092 A | 12/2009 |
| EP | 0141033 A2 | 7/1984 |
| EP | 0141033 A1 | 8/1990 |
| EP | 0141033 B1 | 9/1990 |
| JP | 2004-212174 A | 12/2002 |
| JP | 2016-001163 A | 6/2014 |

* cited by examiner

COMBINATION ELECTRODE HAVING EXTENDED REFERENCE CHAMBER

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2019/084420, filed on Dec. 10, 2019, and published as WO 2020/120472 A1 on Jun. 18, 2020, which in turn claims priority from German Application No. 102018132131.7, filed in Germany on Dec. 13, 2018. This application is a continuation-in-part of International Application No. PCT/EP2019/084420, which is a continuation of German Application No. 102018132131.7. International Application No. PCT/EP2019/084420 is pending as of the filing date of this application, and the United States is an elected state in International Application No. PCT/EP2019/084420. This application claims the benefit under 35 U.S.C. § 119 from German Application No. 102018132131.7. The disclosure of each of the foregoing documents is incorporated herein by reference.

TECHNICAL FIELD

The invention relates to a combination electrode and to a method for producing the combination electrode.

BACKGROUND

A combination electrode is understood to be a combination of a working electrode and a reference electrode that are housed in a single rod. The term measuring electrode is used synonymously for the term working electrode, and the term reference electrode is used synonymously for the term benchmark electrode. The combination electrode can be, for example, a redox sensor or a pH combination electrode that can be used to determine the pH. The pH combination electrode can, for example, be a pH glass electrode.

The reference electrode is often a metal wire immersed in a saline solution. The reference electrode is often a silver-silver chloride electrode that has a silver wire sheathed by an AgCl layer, the silver wire with the AgCl layer being immersed in a KCl solution. A problem with such a reference electrode is that KCl can flow out of the combination electrode via a diaphragm of the combination electrode. This leads to a change in the KCl concentration of the KCl solution, which in turn leads to a change in the electrochemical potential of the reference electrode. The changing electrochemical potential causes measurements that are carried out using the combination electrode to be erroneous. Even if only a small amount of KCl flows out of the combination electrode, erroneous measurements begin to occur after the passage of time. The problem of erroneous measurements is particularly relevant for combination electrodes in miniaturized design because there is only a small amount of space available for the KCl solution, and even a small amount of leakage of KCl solution results in a large proportionate change in the amount of KCl. Such a conventional combination electrode therefore has a limited service life within which it can carry out error-free measurements.

A combination electrode is therefore sought that has an extended service life in which error-free measurements can be made.

SUMMARY

The invention relates to a combination pH electrode having: an inner tube that has a first inner tube longitudinal end, which is closed, and a second inner tube longitudinal end; a first seal, which is situated in the inner tube and seals off the first inner tube longitudinal end; a first electrically conductive fluid, which is situated in the inner tube between the first inner tube longitudinal end and the first seal; an outer tube, which is situated around the inner tube and delimits a reference chamber situated between the outer tube and the inner tube; a through-hole, which is situated in the inner tube between the first seal and the second inner tube longitudinal end and fluidly connects the reference chamber to an extended reference chamber, which is situated inside the inner tube in a region between the first seal and the second inner tube longitudinal end; a second electrically conductive fluid, which is situated in the reference chamber and the extended reference chamber; a working electrode, which extends into the first conductive fluid via the first seal; and a reference electrode, which is in contact with the second conductive fluid. The outer tube has a first outer tube longitudinal end in the region of the first inner tube longitudinal end, and the combination pH electrode has a diaphragm, preferably a hydrogel, in the region of the first outer tube longitudinal end, said diaphragm being designed to keep the second electrically conductive fluid in the reference chamber. The inner tube has a glass membrane in the region of the first inner tube longitudinal end.

A combination electrode for measuring pH includes an inner tube, an outer tube, a working electrode, a reference electrode, and a diaphragm between the inner tube and a first outer tube longitudinal end of the outer tube. The inner tube is disposed within the outer tube. The inner tube has a closed first inner tube longitudinal end and a second inner tube longitudinal end. A reference chamber is formed between the inner tube and the outer tube. A seal is disposed inside the inner tube closer to the first inner tube longitudinal end than to the second inner tube longitudinal end. An extended reference chamber is formed inside the inner tube between the seal and the second inner tube longitudinal end. A first electrically conductive fluid is contained in the inner tube between the seal and the first inner tube longitudinal end. A through-hole is disposed in the inner tube between the seal and the second inner tube longitudinal end.

A second electrically conductive fluid is contained in the reference chamber and in the extended reference chamber. The second electrically conductive fluid passes through the hydrogel diaphragm to fill the reference chamber before the diaphragm swells and seals the annular gap between the inner tube and the first outer tube longitudinal end. The diaphragm retains the second electrically conductive fluid in the reference chamber. The through-hole is adapted to allow the second electrically conductive fluid to flow between the reference chamber and the extended reference chamber such that the fluid that enters the reference chamber can flow into the extended reference chamber. The working electrode extends into the inner tube, through the seal and into the first electrically conductive fluid. The reference electrode is in contact with the second electrically conductive fluid. In one embodiment, the reference electrode is inserted into the reference chamber. In another embodiment, the reference electrode is inserted into the extended reference chamber.

A method of producing a combination electrode involves introducing a second electrically conductive fluid into a reference chamber through a hydrogel diaphragm that later swells and seals an annular gap between an inner tube and a first outer tube longitudinal end of an outer tube. First, a first electrically conductive fluid is introduced into an inner tube that has a closed first inner tube longitudinal end, a second inner tube longitudinal end, and a through-hole. A working electrode is inserted into the inner tube. A seal is formed in the inner tube between the through-hole and the first inner tube longitudinal end such that the first electrically conductive fluid is confined between the seal and the first inner tube longitudinal end. The working electrode extends through the seal and into the first electrically conductive fluid. An extended reference chamber is formed inside the inner tube between the seal and the second inner tube longitudinal end. The inner tube is inserted into the outer tube such that a reference chamber is formed between the inner tube and the outer tube. The reference chamber is connected by the through-hole to the extended reference chamber. The second electrically conductive fluid is introduced into the reference chamber and into the extended reference chamber. The through-hole is adapted to allow the second electrically conductive fluid to flow between the reference chamber and the extended reference chamber. A reference electrode is exposed to the second electrically conductive fluid.

In one embodiment, the reference electrode is exposed to the second electrically conductive fluid in the reference chamber. The reference electrode is inserted into the reference chamber before the second electrically conductive fluid is introduced into the reference chamber. In another embodiment, the reference electrode is exposed to the second electrically conductive fluid in the extended reference chamber. The reference electrode is inserted into the extended reference chamber before the second electrically conductive fluid is introduced into the reference chamber and flows through the through-hole into the extended reference chamber.

The second electrically conductive fluid is introduced into the reference chamber and into the extended reference chamber through the hydrogel diaphragm. First, the first outer tube longitudinal end of the outer tube is immersed into the second electrically conductive fluid. The combination electrode is then placed together with the second electrically conductive fluid into a vacuum container. The vacuum container is evacuated and subsequently ventilated such that the second electrically conductive fluid enters the reference chamber through the hydrogel diaphragm covering the annular gap between the inner tube and the outer tube at the first outer tube longitudinal end. The second electrically conductive fluid then enters the extended reference chamber through the through-hole from the reference chamber.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
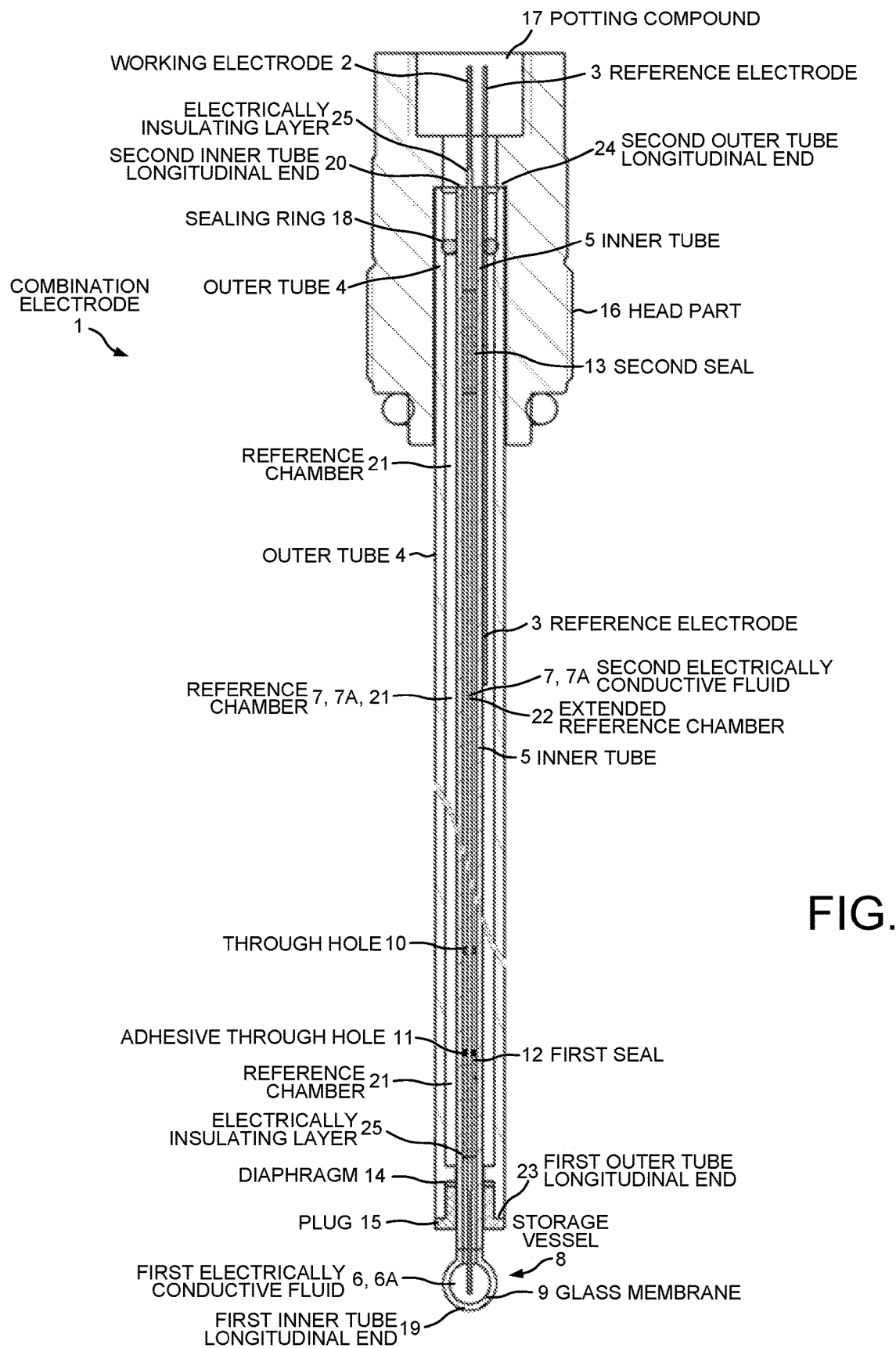
FIG. 1 is a schematic cross-section of a first embodiment of a combination electrode.

FIG. 1 is a cross-sectional view of a novel combination electrode 1 that has a working electrode 2, a reference electrode 3, an outer tube 4, an inner tube 5, a first electrically conductive fluid 6, a second electrically conductive fluid 7, a through-hole 10, and a first seal 12. The inner tube 5 has a first inner tube longitudinal end 19, which is closed, and a second inner tube longitudinal end 20. The first seal 12 is situated in the inner tube 5 and seals off the first inner tube longitudinal end 19. The first electrically conductive fluid 6 is located in the inner tube 5 between the first inner tube longitudinal end 19 and the first seal 12. The outer tube 4 is positioned around the inner tube 5 and delimits a reference chamber 21 located between the outer tube 4 and the inner tube 5. The through-hole 10 is located in the inner tube 5 between the first seal 12 and the second inner tube longitudinal end 20 and fluidly connects the reference chamber 21 to an extended reference chamber 22. The extended reference chamber 22 is situated inside the inner tube 5 in a region between the first seal 12 and the second inner tube longitudinal end 20. The second electrically conductive fluid 7 is located in the reference chamber 21 and the extended reference chamber 22. The working electrode 2 extends into the first conductive fluid 6 via the first seal 12. The reference electrode 3 is in contact with the second conductive fluid 7.

In comparison to a conventional combination electrode, the second electrically conductive fluid 7 of the novel combination electrode 1 is located not only in the reference chamber 21, but also in the extended reference chamber 22. As a result, a larger amount of the second electrically conductive fluid 7 can be used with the combination electrode 1 than with a conventional combination electrode so that leakage or an outflow of the second electrically conductive fluid 7 and/or an electrolyte dissolved therein results in less of a change in concentration of the electrolyte than with a conventional combination electrode. This lower change in concentration results in a longer, useful service life of the combination electrode 1 because the combination electrode 1 is able to carry out error-free measurements during its longer service life.

The fact that the first seal 12 seals off the first inner tube longitudinal end 19 ensures that the first electrically conductive fluid 6 cannot enter the extended reference chamber 22 and mix there with the second electrically conductive fluid 7. Thus, the first electrically conductive fluid 6 is prevented from mixing with the second electrically conductive fluid 7.

The part of the working electrode 2 that is situated in the extended reference chamber 22 is encased by an electrically insulating layer 25. As a result, direct charge transport between the working electrode 2 and the second electrically conductive fluid 7 is prevented.

The reference electrode 3 is disposed in the reference chamber 21 and/or in the extended reference chamber 22. In one embodiment, the reference electrode 3 extends through the through-hole 10 and extends from the reference chamber 21 into the extended reference chamber 22. In other embodiments, the reference electrode 3 is disposed only in the reference chamber 21 or only in the extended reference chamber 22.

The combination electrode 1 includes a printed circuit board that is attached to the inner tube 5. The working electrode 2 and the reference electrode 3 are attached to the printed circuit board. As a result, the printed circuit board attaches the working electrode 2 and the reference electrode 3 on the one hand to the inner tube 5 on the other hand. To attach the printed circuit board to the inner tube 5, the printed circuit board and the inner tube 5 can be glued to one another. If the reference electrode 3 is disposed in the extended reference chamber 22, particularly if the reference electrode 3 is disposed entirely within the extended reference chamber 22, the printed circuit board is constructed with a particularly small form factor. In one embodiment, the printed circuit board protrudes into the inner tube 5. In that case, the printed circuit board is firmly attached to the inner tube 5.

The combination electrode 1 includes a measuring cable that is electrically coupled to the printed circuit board. A measuring signal from the combination electrode 1 is output onto the measuring cable. The printed circuit board has a strain relief mechanism for the measuring cable. The combination electrode 1 has either a plug or a socket that is designed to engage with the another socket or plug that forms part of the measuring cable. Using the measuring cable, readout electronics can easily be connected to the combination electrode 1 in order to read out the measuring signal.

In one embodiment, the combination electrode 1 also includes an additional sensor, such as a temperature sensor. The additional sensor is also connected to the printed circuit board. The additional sensor can extend into the reference chamber 21, into the extended reference chamber 22 and/or into the inner tube 5 at the bottom between the first inner tube longitudinal end 19 and the first seal 12.

The inner tube 5 has an adhesive through-hole 10 that is disposed in the region of the first seal 12. The first seal 12 is inserted into the inner tube 5 through the adhesive through-hole 10, for example, by using a syringe to introduce an adhesive into the inner tube 5 via the adhesive through-hole 10. The adhesive forms the first seal 12 as it hardens. The adhesive can be a silicone adhesive.

The combination electrode 1 has a second seal 13 located in the inner tube 5 that is disposed between the through-hole 10 and the second inner tube longitudinal end 20. The second seal 13 seals off the extended reference chamber 22. This ensures that the second electrically conductive fluid 7 cannot escape from the inner tube 5 via the second inner tube longitudinal end 20. The second seal 13 can be introduced into the inner tube 5 by introducing an adhesive, such as a silicone adhesive, into the inner tube 5 through the second inner tube longitudinal end 20. The adhesive forms the second seal 13 as it hardens. Alternatively, the inner tube 5 has a second adhesive through-hole for introducing the adhesive, which is situated towards the top of inner tube 5 in the region of the second seal 13.

The outer tube 4 has a first outer tube longitudinal end 23 in the region of the first inner tube longitudinal end 19. In addition, the combination electrode 1 has a diaphragm 14 in the region of the first outer tube longitudinal end 23 that is designed to keep the second electrically conductive fluid 7 in the reference chamber 21. Charge transport between the second electrically conductive fluid 7 and a fluid to be measured that is in contact with the diaphragm 14 is allowed through the diaphragm 14. In one embodiment, the diaphragm 14 is a hydrogel.

The inner tube 5 has a glass membrane in the region of the first inner tube longitudinal end 19. Charge transport between the first electrically conductive fluid 6 and the fluid to be measured that is in contact with the glass membrane is allowed through the glass membrane.

In one embodiment, the combination electrode 1 is a pH combination electrode. In another embodiment, the combination electrode 1 is a redox sensor. The pH combination electrode can be a pH glass electrode.

A novel method for producing the combination electrode 1 includes the steps of: providing the inner tube 5, providing an outer tube 4, filling the first electrically conductive fluid 6 into the inner tube 5, introducing the working electrode 2 into the inner tube 5, introducing the first seal 12 into the inner tube 5, arranging the inner tube 5 in the outer tube 4, introducing the reference electrode 3 into the reference chamber 21 and/or the extended reference chamber 22, and introducing the second electrically conductive fluid 7 into the reference chamber 21 and into the extended reference chamber 22.

The inner tube 5 is provided that has a first inner tube longitudinal end 19 that is closed. The first seal 12 is introduced into the inner tube 5 between the through-hole 10 and the first inner tube longitudinal end 19 such that the first electrically conductive fluid 6 is delimited by the first seal 12 in the region of the first inner tube longitudinal end 19. The working electrode 2 extends into the first electrically conductive fluid 6 through the first seal 12. The extended reference chamber 22 is formed inside the inner tube 5 and is disposed in a region between the first seal 12 and the second inner tube longitudinal end 20. The inner tube 5 is arranged inside the outer tube 4 so as to form a reference chamber 21 between the outer tube 4 and the inner tube 5 that is fluidly connected to the extended reference chamber 22 via the through-hole 10. The second electrically conductive fluid 7 is introduced into the reference chamber 21 and the extended reference chamber 22 such that the second electrically conductive fluid 7 is in contact with the reference electrode 3. The through-hole 10 is adapted to allow the second electrically conductive fluid 7 to flow between the reference chamber 21 and the extended reference chamber 22 so that the fluid 7 that enters the reference chamber 21 through the hydrogel diaphragm 14 can also fill the extended reference chamber 22.

In another embodiment, the novel method for producing the combination electrode 1 includes the steps of: sealing the second outer tube longitudinal end 24 of the outer tube 4, and introducing the second electrically conductive fluid 7 into the reference chamber 21 and the extended reference chamber 22. The second outer tube longitudinal end 24 of the outer tube 4 and the second inner tube longitudinal end 20 of inner tube 5 are sealed in the region of the second inner tube longitudinal end 20 before introducing the second electrically conductive fluid 7 into the reference chamber 21 and into the extended reference chamber 22.

The second electrically conductive fluid 7 is introduced into the reference chamber 21 and the extended reference chamber 22 by performing the following substeps. First, the first outer tube longitudinal end 23 of the outer tube 4 is immersed in the region of the first inner tube longitudinal end 19 into the second electrically conductive fluid 7. Second, the combination electrode 1 together with the second electrically conductive fluid 7 is introduced into a vacuum container. Third, the vacuum container is evacuated and subsequently ventilated such that the second electrically conductive fluid 7 enters the reference chamber 21 through a gap formed in the region of the first outer tube longitudinal end 23 between the outer tube 4 and inner tube 5 and such that the second electrically conductive fluid 7 enters the extended reference chamber 22 through the through-hole 10. The gap between the outer tube 4 and inner tube 5 has the shape of an annular gap.

Another embodiment involves a method for filling the reference chamber 21 and the extended reference chamber 22 such that both the reference chamber 21 and the extended reference chamber 22 are filled simultaneously in a common process step. As part of this method, a plurality of combination electrodes are simultaneously immersed in the second electrically conductive fluid 7. The plurality of combination electrodes are also simultaneously placed into a vacuum container for evacuating. The vacuum container is then ventilated. As a result, the second electrically conductive fluid 7 can be introduced into the plurality of combination electrodes simultaneously, making the method cost-effective.

The second inner tube longitudinal end 20 can be sealed off towards the top by providing a second seal 13. The second outer tube longitudinal end 24 is sealed off towards the top using a sealing ring 18 that is disposed between the inner tube 5 and the outer tube 4 and delimits the reference chamber 21. A diaphragm 14, which is a hydrogel in the dry state, is introduced into the gap between the inner tube 5 and the outer tube 4 towards the bottom in the region of the first outer tube longitudinal end 23 before the reference chamber 21 and the extended reference chamber 22 are filled with the second electrically conductive fluid 7.

The hydrogel is a substance that swells on contact with the second electrically conductive fluid 7, in particular when the second electrically conductive fluid 7 comprises water. As a result, when the second electrically conductive fluid 7 is introduced into the reference chamber 21 and the extended reference chamber 22, the second electrical fluid 7 flows into the reference chamber 21 between the diaphragm 14 and the inner tube 5 and/or between the diaphragm 14 and the outer tube 4. At the same time, the diaphragm 14 fully absorbs the second electrically conductive fluid 7, swells completely and thus seals the gap between the inner tube 5 and the outer tube 4 after the second electrically conductive fluid 7 has flowed into the reference chamber 21 and the extended reference chamber 22.

The hydrogel is introduced into the gap in its dry state while the volume of the hydrogel is smaller than the gap. After the second electrically conductive fluid 7 is introduced into the reference chamber 21 and the extended reference chamber 22, the hydrogel swells and increases in volume, and the diaphragm 14 is under compressive stress. As a result, the gap is sealed particularly tightly.

In order to ensure that compressive stress is created, tests are performed of hydrogels in their dry state in various sizes that are smaller than the gap, and the hydrogels are then allowed to swell when they come in contact with the second electrically conductive fluid 7. After swelling, the size of the hydrogels in their swollen state is determined. Only hydrogels of sizes that are larger than the gap in their swollen state are suitable for use as the diaphragm 14. Hydrogels of various sizes that, in their swollen state, are from 10% to 100% larger than the gap, in particular from 30% to 50% larger than the gap, are best suited for used as the diaphragm 14. A suitable degree of swelling Q of the hydrogel is from 115% to 1000%, in particular from 150% to 800%, in particular from 180% to 350%. The degree of swelling Q is defined as $Q=(VQ-VT)/VT$, where VT is the volume of the hydrogel in its dry state, and VQ is the volume of the hydrogel in its swollen state after expanding with the second electrically conductive fluid 7.

The outer tube 4 is formed from at least two shells. In order to fit the inner tube 5 inside the outer tube 4, the inner tube 5 is inserted into the multiple shells. Then the shells are joined together around the inner tube 5 and form the outer tube 4. The shells are designed in such a way that they extend from the first inner tube longitudinal end 19 to the second inner tube longitudinal end 20. The shells are joined together, for example, by ultrasonic welding, laser welding, melting and/or gluing.

The inner tube 5 has an adhesive through-hole 10. In order to form the first seal 12 inside the inner tube 5, an adhesive is introduced into the inner tube 5 via the adhesive through-hole 10. The adhesive then forms the first seal 12 as it hardens.

In the embodiments in which the combination electrode 1 has a printed circuit board, the working electrode 2 and the reference electrode 3 are both attached to the printed circuit board, which produces a combination electrode. The working electrode 2 is then inserted into the inner tube 5, which contains the first electrically conductive fluid 6. Optionally, the reference electrode 3 can also be inserted into the inner tube 5. The first seal 12 is then introduced into the inner tube 5. The second seal 13 is then formed in the inner tube 5 by introducing an adhesive, such as a silicone adhesive, into the inner tube 5. The adhesive also attaches the printed circuit board to the inner tube 5. The adhesive can be introduced into the inner tube 5 through a second adhesive through-hole. Alternatively, the adhesive can also be introduced into the inner tube 5 through a printed circuit board hole disposed in the printed circuit board or through a gap between the printed circuit board and the inner tube 5. The second seal 13 also insulates the working electrode 2 and the optional reference electrode 3 from the testing environment and from one another.

Additional embodiments of the novel combination electrode and method for producing the combination electrode are also possible. The additional embodiments have the following characteristics.

The inner tube 5 is an inner tube made of glass and/or a plastics material. The outer tube 4 is an outer tube made of glass and/or a plastics material. The inner tube 5 has a plurality of through-holes that fluidly connect the reference chamber 21 to the extended reference chamber 22. This permits an increase in the exchange of substances between the reference chamber 21 and the extended reference chamber 22. The through-hole 10 can be in the form of a slot, which also allows an increase in the amount of exchange of substances between the reference chamber 21 and the extended reference chamber 22. There can be a plurality of slots that fluidly connect the reference chamber 21 to the extended reference chamber 22. The reference chamber 21 and the extended reference chamber 22 can be completely filled with the second electrically conductive fluid 7. The chamber situated in the inner tube 5 between the first inner tube longitudinal end 19 and the first seal 12 can be completely filled with first electrically conductive fluid 6.

In one embodiment, the hydrogel includes thermoplastic polyurethane. For example, the hydrogel can consist exclusively of thermoplastic polyurethane. Thermoplastic polyurethane is a block copolymer that includes the monomer A shown below

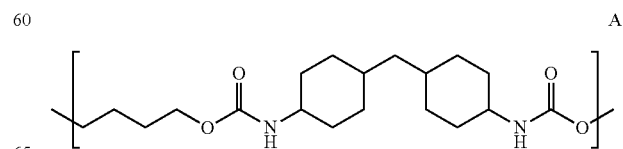

A and a monomer B shown below

For both monomers A and B, the monomer includes the atoms between the left bracket and the right bracket. In the block copolymer, the left side of monomer A is bonded to an oxygen atom of another monomer. Alternatively, to terminate the block copolymer, a hydroxyl group is bonded to the left side of monomer A. The right side of monomer A is bonded to a carbon atom of another monomer. Alternatively, to terminate the block copolymer, a hydrogen atom is bonded to the right side of monomer A. The left side of monomer B is bonded to an oxygen atom of another monomer. Alternatively, to terminate the block copolymer, a hydroxyl group atom is bonded to the left side of monomer B. The right side of monomer B is bonded to a carbon atom of another monomer. Alternatively, to terminate the block copolymer, a hydrogen atom is bonded to the right side of monomer B. The block copolymer can consist essentially of blocks of monomer A and blocks of monomer B and end groups for terminating the block copolymer. The end groups can be the aforementioned hydroxyl groups and/or the aforementioned hydrogen atoms.

The ratio by weight of monomer B to monomer A is from 20 to 100, and preferably from 30 to 90. The average molar mass $\overline{M}$ of the block copolymer is from $50*10^3$ g/mol to $180*10^3$ g/mol, and preferably from $80*10^3$ g/mol to $150*10^3$ g/mol. For the average molar mass $\overline{M}$, the following applies:

$$\overline{M} = \frac{\sum_i^n M_i}{n},$$

where n is the number of polymer chains of the block copolymer, and Mi is the molar mass of the polymer chain i.

The block copolymer is commercially available under the brand name Tecophilic® from the company Lubrizol. Tecophilic® TG-500 and/or Tecophilic® TG-2000 can be used as the block copolymer. The ratio by weight of monomer B to monomer A is around 40 for Tecophilic® TG-500 and around 82 for Tecophilic® TG-2000. The average molar mass $\overline{M}$ of the block copolymer is around $1.4*10^5$ g/mol for Tecophilic® TG-500 and around $8*10^4$ g/mol for Tecophilic® TG-2000.

For example, the hydrogel can also include a polymer that is used to make soft contact lenses. Examples of this are hydroxyethyl methacrylates, vinyl pyrrolidones and/or silicone hydrogels. In one embodiment, the hydrogel is a thermoplastic elastomer. The hydrogel can be a smart hydrogel. For example, the smart hydrogel can be salt-responsive and/or thermoresponsive. An example of a smart hydrogel that is both salt-responsive and thermoresponsive is the aforementioned Tecophilic®. Another example of a smart hydrogel that is thermoresponsive is a polymer based on N-isopropyl acrylamide copolymers.

The working electrode 2 and the reference electrode 3 can include a metal. The first electrically conductive fluid 6 and the second electrically conductive fluid 7 can be a salt solution, such as an aqueous salt solution. The working electrode 2 can be a silver-silver chloride electrode. The first electrically conductive fluid 6 can be an aqueous KCl solution. The first electrically conductive fluid 6 can also have a buffer, such as an acetate buffer and/or a phosphate buffer. The reference electrode 3 can be a silver-silver chloride electrode. The second electrically conductive fluid 7 can be an aqueous KCl solution. The KCl concentration of the second electrically conductive fluid 7 can be, for example, 3 mol/l.

The combination electrode 1 can be a pH combination electrode and/or a redox sensor. The pH combination electrode can be a pH glass electrode. The first and second embodiments described below relate to a pH glass electrode.

Figure 2:
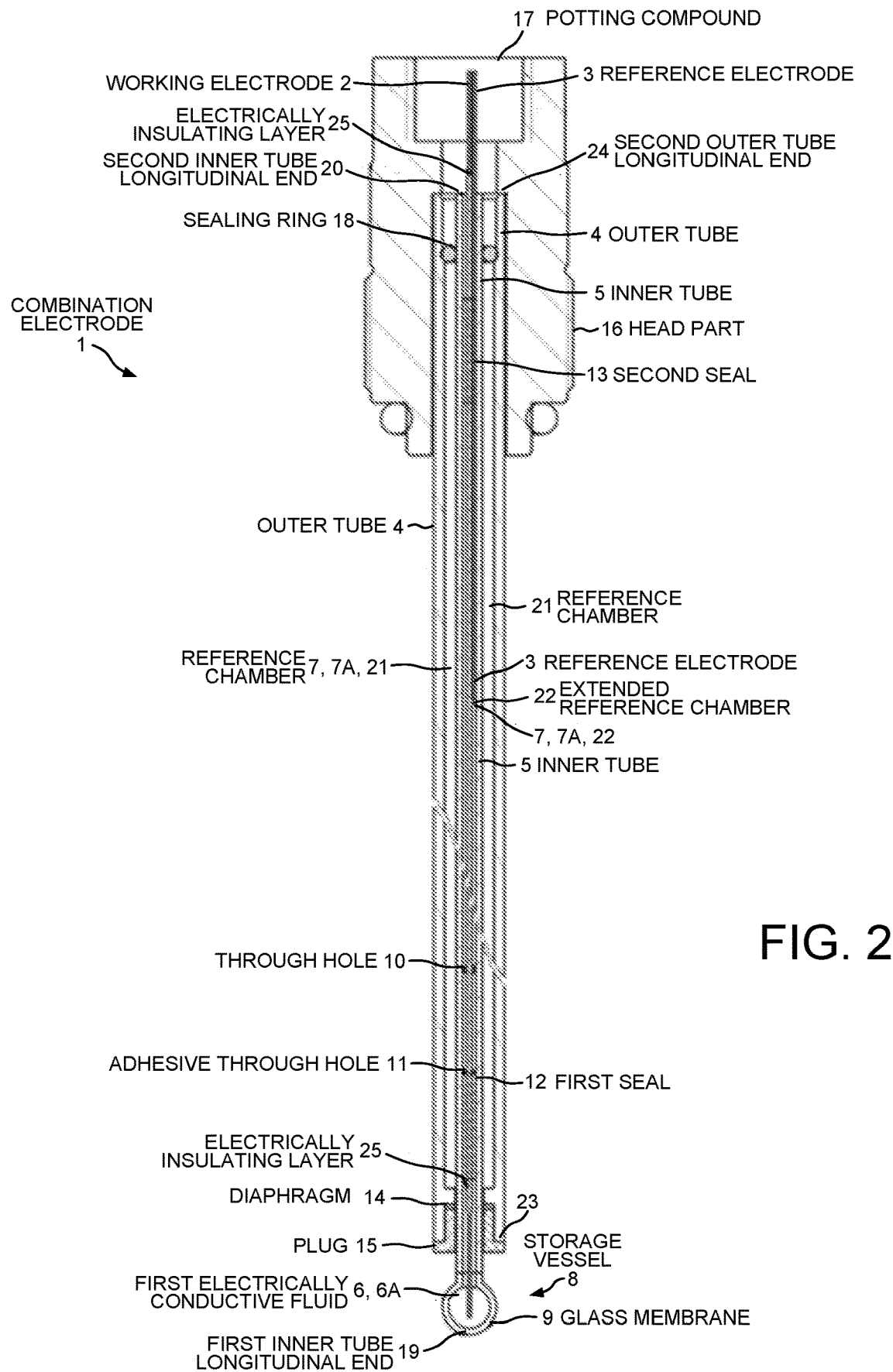
FIG. 2 is a schematic cross-section of a second embodiment of a combination electrode.

As can be seen from FIGS. 1 and 2, the combination electrode 1 has the outer tube 4 that is situated around the inner tube 5 such that an annular gap is formed between the inner tube 5 and the outer tube 4. The inner tube 5 has a first inner tube longitudinal end 19, which is closed, and a second inner tube longitudinal end 20. Analogously, the outer tube 4 has a first outer tube longitudinal end 23, which is disposed in the region of the first inner tube longitudinal end 19, and a second outer tube longitudinal end 24, which is disposed in the region of the second inner tube longitudinal end 20. The combination electrode 1 has a first seal 12, which is disposed in the inner tube 5 and seals off the first inner tube longitudinal end 19. In addition, the combination electrode has a first electrically conductive fluid 6 that is contained in the inner tube 5 between the first inner tube longitudinal end 19 and the first seal 12 such that it cannot escape from this region.

The outer tube 4 and the inner tube 5 delimit a reference chamber 21 that is disposed between the outer tube 4 and the inner tube 5 and that has the shape of an annular chamber. An extended reference chamber 22 is situated within the inner tube 5 in a region between the first seal 12 and the second inner tube longitudinal end 20. Thus, the reference chamber 21 is located outside of the inner tube 5, and the extended reference chamber 22 is located inside of the inner tube 5.

The inner tube 5 has a through-hole 10 that is located between the first seal 12 and the second inner tube longitudinal end 20. The through-hole 10 connects the reference chamber 21 to the extended reference chamber 22 and allows fluids to flow between the two chambers. The combination electrode 1 has a second electrically conductive fluid 7 that is contained in the reference chamber 21 and the extended reference chamber 22. In addition, the combination electrode 1 has a working electrode 2 that extends from the second inner tube longitudinal end 20 through the first seal 12 and into the first conductive fluid 6 such that the working electrode 2 comes in contact with the first conductive fluid 6. In addition, the combination electrode 1 has a reference electrode 3 that is in contact with the second conductive fluid 7.

The combination electrode 1 has a diaphragm 14 in the region of the first outer tube longitudinal end 23. The diaphragm 14 is inserted into the annular gap between the inner tube 5 and the outer tube 4 and is adapted to retain the second electrically conductive fluid 7 in the reference chamber 21. The diaphragm 14 can be a hydrogel. The inner tube 5 has a glass membrane 9 in the region of the first inner tube longitudinal end 19. The diaphragm 14 and the glass membrane 9 are designed to keep the second electrically conductive fluid 7 and the first electrically conductive fluid 6 inside the combination electrode 1, but to allow charge transport with a fluid to be measured that is in contact with the diaphragm 14 and the glass membrane 9. During operation of the combination electrode 1, the first inner tube longitudinal end 19 and the first outer tube longitudinal end 23 are held below the level of the fluid to be measured. The fluid to be measured can, for example, be a measuring solution, such as an aqueous measuring solution whose pH is being measured.

FIGS. 1 and 2 show that the combination electrode 1 has a second seal 13 disposed inside the inner tube 5, which is located between the through-hole 10 and the second inner tube longitudinal end 20 and seals off the extended reference chamber 22. The extended reference chamber 22 is thus disposed within the inner tube 5 and extends from the first seal 12 to the second seal 13. The part of the working electrode 2 that is located in the extended reference chamber 22 is encased by an electrically insulating layer 25.

The electrically insulating layer 25 separates the second electrically conductive fluid 7 from the working electrode 2, such that a direct charge transport between the working electrode 2 and the second electrically conductive fluid 7 is prevented. The part of the working electrode 2 that is located inside the inner tube 5 between the second seal 13 and the second inner tube longitudinal end 20 can also be encased by the electrically insulating layer 25. In addition, the part of the working electrode 2 that is located outside the inner tube 5 can also be encased by the electrically insulating layer 25. The electrically insulating layer 25 extends at least from the second seal 13 to the first seal 12. In addition, the electrically insulating layer 25 can extend into the chamber situated between the first inner tube longitudinal end 19 and the first seal 12 so long as a part of the working electrode 2 that is free of the electrically insulating layer 25 contacts the first electrically conductive fluid.

FIGS. 1 and 2 also show that the combination electrode 1 has a sealing ring 18, which is disposed in the annular gap between the outer tube 4 and the inner tube 5 in the region of the second inner tube longitudinal end 20 and the second outer tube longitudinal end 24. The sealing ring 18 seals off the reference chamber 21. The reference chamber 21 thus extends from the diaphragm 14 to the sealing ring 18.

In one embodiment, the combination electrode 1 has a printed circuit board (not shown) that is attached to the inner tube 5 in the region of the second inner tube longitudinal end 20 and to which the working electrode 2 and the reference electrode 3 are attached. The printed circuit board protrudes into the inner tube 5. The second seal 13 includes an adhesive, such as a silicone adhesive, that attaches the printed circuit board to the inner tube 5. As the adhesive hardens, the adhesive forms the second seal 13. The inner tube 5 can have a second adhesive through-hole in the region of the second seal 13 through which the adhesive is introduced into the inner tube 5.

FIG. 1 shows the first embodiment of the combination electrode 1 in which the reference electrode 3 is situated in the reference chamber 21. In particular, the reference electrode 3 is disposed only in the reference chamber 21 and not in the extended reference chamber 22. FIG. 2 shows the second embodiment of the combination electrode 1 in which the reference electrode 3 is situated in the extended reference chamber 22 inside inner tube 5. In particular, the reference electrode 3 is disposed only in the extended reference chamber 22 inside inner tube 5 and not in the reference chamber 21 outside inner tube 5. In the second embodiment, the part of the working electrode 2 that is located in the inner tube 5 between the second seal 13 and the second inner tube longitudinal end 20 is encased by the electrically insulating layer 25 so that the working electrode 2 and the reference electrode 3 cannot come into contact with each other.

FIGS. 1 and 2 show that the inner tube 5 has an adhesive through-hole 11 located in the region of the first seal 12. An adhesive, such as a silicone adhesive, can be introduced into the inner tube 5 through the adhesive through-hole 11. The adhesive forms the first seal 12 as it hardens.

FIGS. 1 and 2 show that the combination electrode 1 has a head part 16 surrounding the outer tube 4 in the region of the second outer tube longitudinal end 24. The head part 16 extends upward past the second outer tube longitudinal end 24. The head part 16 has a cavity in its interior that is filled with a potting compound 17. In addition to the sealing ring 18 and the second seal 13, the potting compound 17 provides an additional seal that isolates the electrodes and chambers from the exterior environment. The potting compound 17 can be a silicone adhesive. By providing the potting compound 17, the working electrode 2 and the reference electrode 3 are electrically insulated from one another and from the environment.

The inner tube 5 has a storage vessel 8 at its first inner tube longitudinal end 19. The storage vessel 8 has a larger internal cross section than the remainder of the inner tube 5, which allows a larger amount of the first electrically conductive fluid 6 to be contained in the inner tube 5 than if the storage vessel 8 were not present.

The combination electrode 1 has a plug 15 that is disposed in the annular gap between the outer tube 4 and inner tube 5 on the side of the diaphragm 14 facing away from the reference chamber 21. The plug 15 supports the diaphragm 14. The plug 15 is permeable to the fluid whose characteristics are being measured. In order to render the plug 15 permeable, the plug can have one or more plug throughholes and/or the plug can be porous.

Where the combination electrode 1 of FIGS. 1 and 2 is a pH glass electrode, the first electrically conductive fluid can be an inner buffer 6A. The inner buffer 6A can comprise an aqueous KCl solution. The inner buffer 6A can also be an acetate buffer and/or a phosphate buffer. The second electrically conductive fluid 7 can be an aqueous solution, such as an aqueous KCl solution 7A. In one embodiment, the KCl concentration of the aqueous KCl solution 7A is 3 mol/l. The working electrode 2 and the reference electrode 3 can each be a silver-silver chloride electrode. The pH glass electrode would then have the following electrochemical series: Ag(s) |AgCl(s)|K+(aq)Cl−(aq)|| glass membrane 9||fluid to be measured||diaphragm 14||K+(aq)Cl−(aq)|AgCl(s)|Ag(s). An electrical potential can now be measured between the two Ag(s) elements. The pH of the fluid to be measured can be determined based on the electrical potential between the two silver elements.

A novel method of producing the combination electrode 1 includes the steps: providing the inner tube 5, providing the outer tube 4, filling the first electrically conductive fluid 6 into the inner tube 5, inserting the working electrode 2 into the inner tube 5, introducing the first seal 12 into the inner tube 5, inserting the inner tube 5 into the outer tube 4, inserting the reference electrode 3 into the reference chamber 21 or into the extended reference chamber 22, and introducing the second electrically conductive fluid 7 into the reference chamber 21 and into the extended reference chamber 22 such that the reference electrode 7 is exposed to the second electrically conductive fluid 7. The first seal 12 is injected through hole 11 into the inner tube 5 between the through-hole 10 and the first inner tube longitudinal end 19 such that the first electrically conductive fluid 6 is contained in the inner tube 5 between the first seal 12 and the first inner tube longitudinal end 19. Injecting the material for the first seal 12 through the adhesive through-hole 11 and into the inner tube 5 also forms the extended reference chamber 22 inside inner tube 5. The inner tube 5 is placed inside the outer tube 4 such that the reference chamber 21 is formed outside the inner tube 5 and is fluidly connected to the extended reference chamber 22 inside the inner tube 5 via the through-hole 10. The reference electrode 3 is introduced into the reference chamber 21 and/or into the extended reference chamber 22.

The second inner tube longitudinal end 20 and the second outer tube longitudinal end 24 are sealed off, and then the reference chamber 21 and the extended reference chamber 22 are filled with the second electrically conductive fluid 7 such that the second electrically conductive fluid 7 contacts the reference electrode 3. The second outer tube longitudinal end 24 can be sealed off by inserting the sealing ring 18 into the annular gap between the inner tube 5 and the outer tube 4. The second inner tube longitudinal end 20 can be sealed off by injecting the second seal 13 into the inner tube 5. In addition, the second outer tube longitudinal end 24 and the second inner tube longitudinal end 20 can be sealed off by attaching the head part 16 to the outer tube 4 and then filling the cavity of the head part 16 with the potting compound 17. Subsequently, the first outer tube longitudinal end 23 is immersed in the second electrically conductive fluid 7. The combination electrode 1 is then placed together with the second electrically conductive fluid 7 in a vacuum container, for example a desiccator. The vacuum container is evacuated and ventilated such that the second electrically conductive fluid 7 enters the reference chamber 21 through the annular gap and enters the extended reference chamber 22 through the through-hole 10. The reference electrode 3 in the reference chamber 21 or in the extended reference chamber 22 is thereby exposed to the second electrically conductive fluid 7. It is particularly advantageous for the second outer tube longitudinal end 24 and the second inner tube longitudinal end 20 to be additionally sealed off by the potting compound 17 because that ensures that no air will enter the reference chamber 21 and the extended reference chamber 22 through the second outer tube longitudinal end 24 and the second inner tube longitudinal end 20 when the vacuum container is ventilated. The reference chamber 21 and the extended reference chamber 22 can thus be completely filled with the second electrically conductive fluid 7. The vacuum container can be evacuated to a pressure of 50 mbar to 100 mbar, in particular 80 mbar.

In one embodiment, the diaphragm 14, which is a hydrogel in its dry state, is introduced into the gap in the region of the first outer tube longitudinal end 23 before the second electrically conductive fluid 7 is introduced into the reference chamber 21 and into the extended reference chamber 22. As a result, the hydrogel swells when it comes into contact with the second electrically conductive fluid 7, in particular when the second electrically conductive fluid 7 comprises water. As a result, the hydrogel seals off the reference chamber 21 only after the reference chamber 21 and the extended reference chamber 22 are filled with the second electrically conductive fluid 7.

The hydrogel preferably comprises thermoplastic polyurethane and can consist essentially of thermoplastic polyurethane. Thermoplastic polyurethane is preferably a block copolymer that includes the monomer A

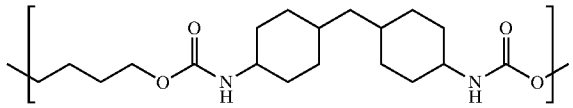

and the monomer B

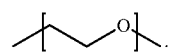

An oxygen atom can be bonded to the left side of monomer A or a hydroxyl group can be bonded there to terminate the block copolymer. A carbon atom can be bonded to the right side of monomer A or a hydrogen atom can be bonded there to terminate the block copolymer. An oxygen atom can be bonded to the left side of monomer B or a hydroxyl group can be bonded there to terminate the block copolymer. A carbon atom can be bonded to the right side of monomer B or a hydrogen atom can be bonded there to terminate the block copolymer. The block copolymer can consist essentially of blocks of monomer A and blocks of monomer B and end groups for terminating the block copolymer. The end groups can be the aforementioned hydroxyl groups and/or hydrogen atoms.

The ratio by weight of monomer B to monomer A is from 20 to 100 and preferably from 30 to 90. The average molar mass $\overline{M}$ of the block copolymer is from $50*10^3$ g/mol to $180*10^3$ g/mol, and preferably from $80*10^3$ g/mol to $150*10^3$ g/mol. The average molar mass $\overline{M}$ is determined using the following formula:

$$\overline{M} = \frac{\sum_i^n M_i}{n},$$

where n is the number of polymer chains of the block copolymer, and Mi is the molar mass of the polymer chain i.

The block copolymer is commercially available under the brand name Tecophilic® from Lubrizol. Tecophilic® TG-500 and/or Tecophilic® TG-2000 come into consideration by way of example. The ratio by weight of monomer B to monomer A is around 40 for Tecophilic® TG-500 and around 82 for Tecophilic® TG-2000. The average molar mass $\overline{M}$ of the block copolymer is around $1.4*10^5$ g/mol for Tecophilic® TG-500 and around $8*10^4$ g/mol for Tecophilic® TG-2000.

In one embodiment, the hydrogel is made of a polymer that is used in soft contact lenses. Examples of this are hydroxyethyl methacrylates, vinyl pyrrolidones and/or silicone hydrogels. Alternatively, the hydrogel can be a thermoplastic elastomer. The hydrogel can be a smart hydrogel, such as a salt-responsive and/or thermoresponsive hydrogel. An example of a smart hydrogel that is both salt-responsive and thermoresponsive is the aforementioned Tecophilic®. Another example of a smart hydrogel that is thermoresponsive is a polymer based on N-isopropyl acrylamide copolymers.

The hydrogel is inserted into the gap in its dry state when the hydrogel is smaller than the gap. After the reference chamber 21 and the extended reference chamber 22 are filled with the second electrically conductive fluid 7, the hydrogel expands and forms the diaphragm 14, which is under compressive stress between the inner tube 5 and the outer tube 4. As a result, the gap is sealed particularly tightly. In order to ensure that the compressive stress is created, preliminary tests of hydrogels of various sizes are performed.

In their dry state, the hydrogels are all smaller than the gap. After the hydrogels come in contact with the second electrically conductive fluid 7, the hydrogels swell. In the preliminary tests, the size of the variously sized hydrogels in their swollen state is determined, and only hydrogels of those sizes that are larger than the gap in their swollen state are used for the diaphragm 14. Only those hydrogels should be used whose sizes in their swollen states are from 10% to 100% larger than the gap and preferably from 30% to 50% larger than the gap. The degree of swelling Q of the hydrogel can be from 115% to 1000%, preferably from 150% to 800%, and more preferably from 180% to 350%. The degree of swelling Q is defined as $Q=(V_Q-V_T)/V_T$, where $V_T$ is the volume of the hydrogel in its dry state, and $V_Q$ is the volume of the hydrogel in its swollen state after swelling with the second electrically conductive fluid 7.

LIST OF REFERENCE NUMERALS 1 combination electrode
2 working electrode
3 reference electrode
4 outer tube
5 inner tube
6 first electrically conductive fluid
6A inner buffer
7 second electrically conductive fluid
7A KCl solution
8 storage vessel
9 glass membrane
10 through-hole
11 adhesive through-hole
12 first seal
13 second seal
14 diaphragm
15 plug
16 head part
17 potting compound
18 sealing ring
19 first inner tube longitudinal end
20 second inner tube longitudinal end
21 reference chamber
22 extended reference chamber
23 first outer tube longitudinal end
24 second outer tube longitudinal end
25 electrically insulating layer Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A combination electrode comprising:
    an outer tube;
    an inner tube disposed within the outer tube, wherein the inner tube has a closed first inner tube longitudinal end and a second inner tube longitudinal end, and wherein a reference chamber is formed between the inner tube and the outer tube;
    a first seal disposed inside the inner tube closer to the first inner tube longitudinal end than to the second inner tube longitudinal end, wherein an extended reference chamber is formed inside the inner tube between the first seal and the second inner tube longitudinal end;
    a first electrically conductive fluid contained in the inner tube between the first seal and the first inner tube longitudinal end;
    a through-hole disposed in the inner tube between the first seal and the second inner tube longitudinal end;
    a second electrically conductive fluid contained in the reference chamber and in the extended reference chamber, wherein the through-hole is adapted to allow the second electrically conductive fluid to flow between the reference chamber and the extended reference chamber;
    a working electrode that extends into the inner tube, through the first seal and into the first electrically conductive fluid; and
    a reference electrode that is in contact with the second electrically conductive fluid.

2. The combination electrode of claim 1, wherein a portion of the working electrode is disposed in the extended reference chamber, and wherein the portion of the working electrode that is disposed in the extended reference chamber is encased by an electrically insulating layer.

3. The combination electrode of claim 1, wherein the reference electrode extends into the reference chamber.

4. The combination electrode of claim 1, wherein the reference electrode extends into the extended reference chamber.

5. The combination electrode of claim 1, further comprising:
    a printed circuit board attached to the inner tube, the working electrode and the reference electrode.

6. The combination electrode of claim 1, wherein the inner tube has an adhesive through-hole through which an adhesive can be introduced disposed adjacent to the first seal.

7. The combination electrode of claim 1, wherein the combination electrode has a second seal disposed inside the inner tube, wherein the second seal is located between the through-hole and the second inner tube longitudinal end, and wherein the extended reference chamber extends from the first seal to the second seal.

8. The combination electrode of claim 1, wherein the outer tube has a first outer tube longitudinal end that is opposite a second outer tube longitudinal end, wherein the second outer tube longitudinal end is adjacent to the second inner tube longitudinal end, further comprising:
    a diaphragm near the first outer tube longitudinal end, wherein the diaphragm retains the second electrically conductive fluid in the reference chamber.

9. The combination electrode of claim 8, wherein the diaphragm is made of a hydrogel.

10. The combination electrode of claim 1, wherein the first inner tube longitudinal end is a glass membrane.

11. The combination electrode of claim 10, wherein the glass membrane forms a bulb at the first inner tube longitudinal end.

12. The combination electrode of claim 1, wherein the combination electrode is a pH glass electrode.

13. The combination electrode of claim 1, wherein the combination electrode is a redox sensor at which an oxidation-reduction reaction occurs while the combination electrode is used to determine pH.

14. A method of producing a combination electrode, comprising:
    introducing a first electrically conductive fluid into an inner tube, wherein the inner tube has a closed first inner tube longitudinal end, a second inner tube longitudinal end, and a through-hole;
    inserting a working electrode into the inner tube;
    forming a first seal in the inner tube between the through-hole and the first inner tube longitudinal end such that the first electrically conductive fluid is confined between the first seal and the first inner tube longitudinal end, wherein the working electrode extends through the first seal and into the first electrically conductive fluid, and wherein an extended reference chamber is formed inside the inner tube between the first seal and the second inner tube longitudinal end;

inserting the inner tube into an outer tube such that a reference chamber is formed between the inner tube and the outer tube, wherein the reference chamber is connected by the through-hole to the extended reference chamber;

introducing a second electrically conductive fluid into the reference chamber and into the extended reference chamber, wherein the through-hole is adapted to allow the second electrically conductive fluid to flow between the reference chamber and the extended reference chamber; and exposing a reference electrode to the second electrically conductive fluid.

15. The method of claim 14, wherein the reference electrode is exposed to the second electrically conductive fluid in the reference chamber.

16. The method of claim 15, wherein the reference electrode is inserted into the reference chamber before the second electrically conductive fluid is introduced into the reference chamber.

17. The method of claim 14, wherein the reference electrode is exposed to the second electrically conductive fluid in the extended reference chamber.

18. The method of claim 14, wherein the outer tube initially comprises two shells, and wherein the inserting of the inner tube into the outer tube is performed by placing the two shells around the inner tube and subsequently joining the two shells together to form the outer tube.

19. The method of claim 14, wherein an adhesive through-hole is disposed in the inner tube, and wherein the first seal is formed by injecting an adhesive into the adhesive through-hole so as to form the first seal when the adhesive hardens.

20. The method of claim 14, further comprising:

sealing a second outer tube longitudinal end of the outer tube and the second inner tube longitudinal end, wherein the second outer tube longitudinal end is disposed adjacent to the second inner tube longitudinal end, wherein a first outer tube longitudinal end of the outer tube is disposed adjacent to the first inner tube longitudinal end, wherein an annular gap is disposed between the inner tube and the outer tube at the first outer tube longitudinal end, wherein the sealing is performed before the second electrically conductive fluid is introduced into the reference chamber and into the extended reference chamber, and wherein the introducing of the second electrically conductive fluid into the reference chamber and into the extended reference chamber further comprises:

immersing the first outer tube longitudinal end into the second electrically conductive fluid;

placing the combination electrode together with the second electrically conductive fluid into a vacuum container; and evacuating and subsequently ventilating the vacuum container such that the second electrically conductive fluid enters the reference chamber through the annular gap and then enters the extended reference chamber through the through-hole.

21. The method of claim 20, further comprising:

inserting a diaphragm into the annular gap before the introducing of the second electrically conductive fluid into the reference chamber and into the extended reference chamber.

22. The method of claim 21, wherein the diaphragm is made of a hydrogel, wherein the diaphragm is in a dry state when it is inserted into the annular gap, and wherein the hydrogel swells after coming in contact with the second electrically conductive fluid such that the diaphragm is under compressive stress in the annular gap.

* * * * *